United States Patent
Veverka

(10) Patent No.: US 11,507,990 B2
(45) Date of Patent: Nov. 22, 2022

(54) LOTTERY SYNDICATE SYSTEM

(71) Applicants: TMS GLOBAL SERVICES PTY LTD, Brisbane (AU); Mike Veverka, Brisbane (AU)

(72) Inventor: Mike Veverka, Brisbane (AU)

(73) Assignee: TMS Global Services Pty Ltd, Queensland (AU)

(*) Notice: Subject to any disclaimer, the term of this patent is extended or adjusted under 35 U.S.C. 154(b) by 1078 days.

(21) Appl. No.: 14/411,882

(22) PCT Filed: Apr. 24, 2013

(86) PCT No.: PCT/AU2013/000427
§ 371 (c)(1),
(2) Date: Dec. 29, 2014

(87) PCT Pub. No.: WO2014/000018
PCT Pub. Date: Jan. 3, 2014

(65) Prior Publication Data
US 2015/0339741 A1    Nov. 26, 2015

(30) Foreign Application Priority Data

Jun. 28, 2012 (AU) .................. 2012902765

(51) Int. Cl.
*G06Q 30/06*   (2012.01)
*G06Q 90/00*   (2006.01)
*G07F 17/32*   (2006.01)

(52) U.S. Cl.
CPC ......... *G06Q 30/0605* (2013.01); *G06Q 90/00* (2013.01); *G07F 17/329* (2013.01); *G07F 17/3272* (2013.01)

(58) Field of Classification Search
CPC ......... G06Q 30/06–0645; G06Q 30/08; G06Q 50/01; G06Q 90/00; G07F 17/3272; G07F 17/329
See application file for complete search history.

(56) References Cited

U.S. PATENT DOCUMENTS

| | | | | |
|---|---|---|---|---|
| 6,929,544 B2 * | 8/2005 | Osterer | ................ | G06Q 30/02 463/17 |
| 7,374,483 B2 * | 5/2008 | Wiltshire | ................ | G07F 17/32 463/17 |
| 7,946,913 B2 * | 5/2011 | Yacenda | ............. | G07F 17/3237 463/17 |

(Continued)

OTHER PUBLICATIONS

Chen, "A Secure and Fair Joint E-Lottery Protocol," The Scientific World Journal, Hindawi Publishing Corporation, vol. 2014, Article ID 139435, May 4, 2014, 14 pages. (Year: 2014).*

(Continued)

*Primary Examiner* — Adam L Levine
(74) *Attorney, Agent, or Firm* — Hickman Becker Bingham Ledesma LLP

(57) ABSTRACT

The present invention relates to a lottery syndicate system. The system includes a server for receiving confirmation of a lottery syndicate member, with a mobile internet device, being at a geographic location to qualify as a member of a lottery ticket syndicate. Typically, the geographic location is a store which has increased patronage by virtue of the lottery syndicate members being at that location.

11 Claims, 2 Drawing Sheets

(56) References Cited

U.S. PATENT DOCUMENTS

| | | | | |
|---|---|---|---|---|
| 8,192,269 B2* | 6/2012 | Yacenda | ............. | G07F 17/3237 |
| | | | | 463/17 |
| 8,348,742 B2* | 1/2013 | Yacenda | ............. | G07F 17/3237 |
| | | | | 463/17 |
| 8,512,133 B2* | 8/2013 | Hardy | ..................... | G07F 17/32 |
| | | | | 463/16 |
| 8,523,684 B2* | 9/2013 | Lutnick | ............... | G07F 17/3293 |
| | | | | 463/47 |
| 8,668,568 B2* | 3/2014 | Denker | ................ | G07F 17/329 |
| | | | | 709/217 |
| 9,129,476 B2* | 9/2015 | Hardy | ..................... | G07F 17/32 |
| 2003/0224855 A1* | 12/2003 | Cunningham | .......... | A63F 13/10 |
| | | | | 463/41 |
| 2005/0215306 A1* | 9/2005 | O'Donnell | .............. | A63F 13/12 |
| | | | | 463/17 |
| 2010/0105462 A1* | 4/2010 | Walker | ................ | G07C 15/006 |
| | | | | 463/17 |
| 2010/0160035 A1* | 6/2010 | Herrmann | ........... | G07F 17/3274 |
| | | | | 463/25 |
| 2013/0310130 A1* | 11/2013 | Asthana | ................ | G07F 17/329 |
| | | | | 463/17 |

OTHER PUBLICATIONS

International Searching Authority, in application No. PCT/AU2013/000427, dated Jul. 8, 2013, 7 Pages, Written opinion and declaration of nonestablishment of search report.
Claims in application No. PCT/AU2013/000427, dated Jul. 2013, 3 pages.

* cited by examiner

LOTTERY SYNDICATE SYSTEM

This application is a U.S. National Stage Patent Application filed under 35 U.S.C. § 371 of International Patent Application No. PCT/AU2013/000427, filed 24 Apr. 2013, which claims priority to Australia application 2012902765, filed 28 Jun. 2012, the entire contents of all of which are hereby incorporated by reference as if fully set forth herein for all purposes.

TECHNICAL FIELD

The present invention relates to lottery syndicate techniques.

BACKGROUND

The reference to any prior art in this specification is not, and should not be taken as an acknowledgement or any form of suggestion that the prior art forms part of the common general knowledge.

Lottery is a form of gaming which involves the drawing of numbers for a prize pool.

It is known that some people get together and play a syndicate (also known as a group play) in a lottery draw by combining money to purchase an increased number of tickets for a lottery draw, thereby increasing the possibility of winning.

However, coordinating the syndicate can be complicated, particularly when syndicate members are located far apart which also undesirably reduces social interaction with other syndicate members. A syndicate manager may purchase a ticket on behalf of the syndicate. It is not unusual for syndicate members to be tardy in paying the syndicate manager which can cause complications, particularly in the event of a win.

Newsagents, convenience stores and gas stations traditionally sell lottery tickets on behalf of lottery providers such as the New York Lottery, the Tatts Group etc. These resellers only receive a small commission for the sale of each ticket and further rely upon sales of other items (e.g. newspapers, drinks, etc.). In recent times, many lottery players have taken to purchasing their lottery tickets via the Internet which has adversely affected the revenue of resellers from not only the tickets themselves but other items.

Embodiments of the present invention ameliorate the above-mentioned disadvantages, or at least provide lottery players with a useful lottery play choice.

SUMMARY OF THE INVENTION

According to one aspect of the present invention, there is provided a lottery syndicate system including:

a server for receiving confirmation of a lottery syndicate member with a mobile internet device being at a geographic location to qualify as a member of a lottery ticket syndicate.

The geographic location may be a store which has increased patronage by virtue of the lottery syndicate members being at that location.

The system may further include the mobile internet device (e.g. smart phone, iPAD, PDA, laptop, etc.) of the syndicate member for sending the geographic location to the server.

The server may include a syndicate verification module to confirm that syndicate members are or have been at the geographic location to qualify. The server may include a ticket purchasing module for purchasing a lottery ticket for the syndicate.

The server may include an incentive module for providing the syndicate members with an incentive to join the syndicate.

The server may include an invitation module for sending syndicate membership invitations to syndicate members to join the syndicate. The system may include another server for sending meeting invitations to meet at the geographic location to join the syndicate.

The server may include a result notification module for notifying each syndicate member of the result.

According to another aspect of the present invention, there is provided a lottery syndicate method involving the step of:

receiving, with a server, confirmation of a lottery syndicate member with a mobile internet device being at a geographic location to qualify as a member of a lottery ticket syndicate.

The method may further include the step of receiving further confirmation that other syndicate members are at geographic location to qualify for the syndicate. The syndicate members may or may not all need to be at the geographic location simultaneously to qualify. The method may further involve the step of purchasing a lottery ticket for the syndicate. The ticket may be purchased conditional to all syndicate members being at the geographic location and satisfying payment conditions for the ticket.

The method may further include providing the syndicate members with an incentive to join the syndicate. The incentive may be provided responsive to a ticket purchase. The incentive may be provided by a store at or near the geographic location. The incentive may include an increased prize pool or selection of numbers for a draw.

The method may further include the step of receiving check-in notifications.

The method may further include the step of sending syndicate membership invitations to syndicate members to join the syndicate. The invitations may be sent during a time window. The invitations may be sent responsive to searching for and detecting the presence of prospective syndicate members at the geographic location.

The method may further include the step of notifying each syndicate member of the result.

The method may further include sending meeting invitations to meet at the geographic location to join the syndicate.

According to another aspect of the present invention, there is provided a lottery syndicate system including:

a server for receiving confirmation of a lottery syndicate member joining a lottery ticket syndicate to qualify for an incentive.

According to another aspect of the present invention, there is provided a lottery syndicate method involving the step of:

receiving, with a server, confirmation of a lottery syndicate member joining a lottery ticket syndicate to qualify for an incentive.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
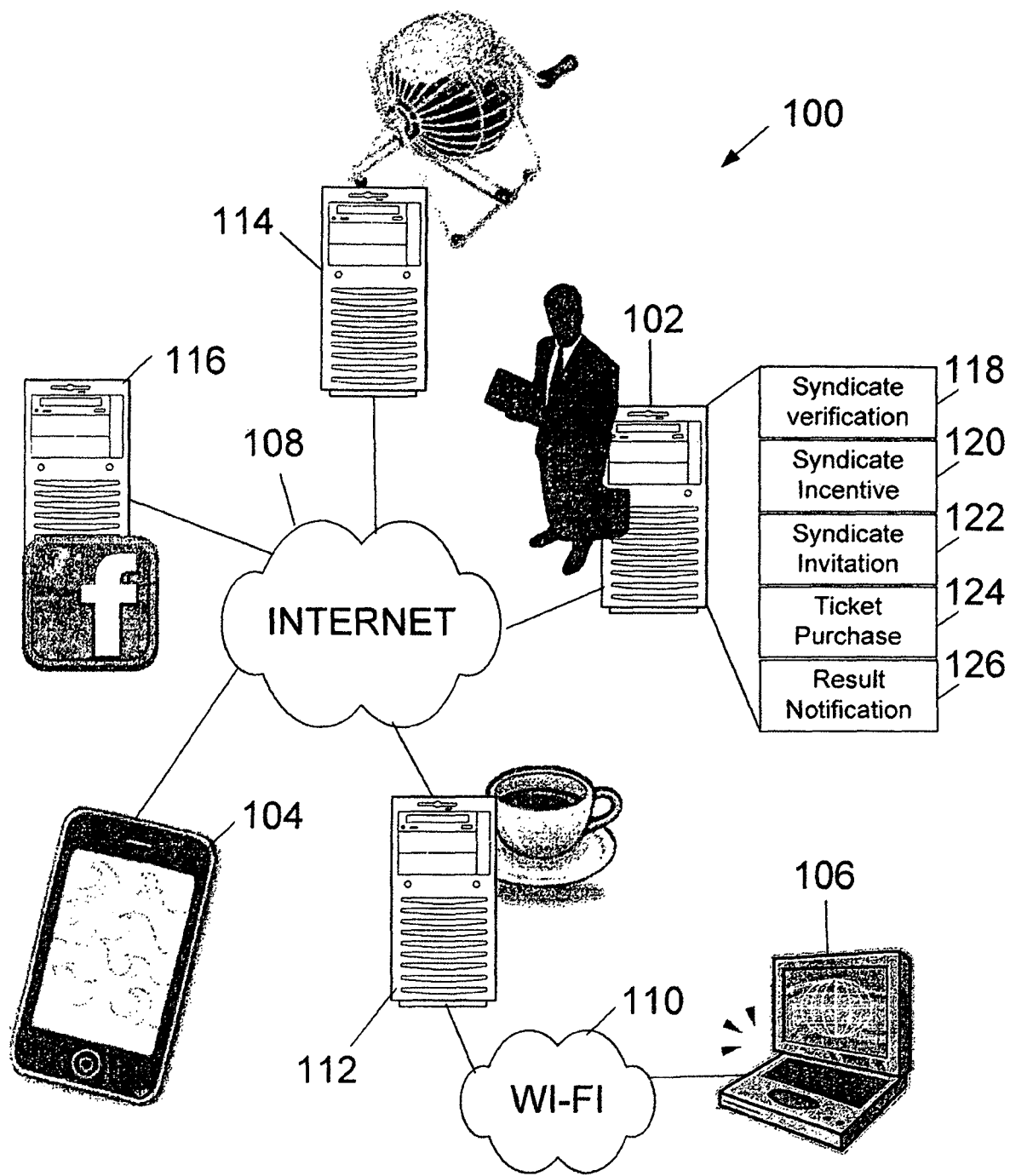
FIG. 1 is a block diagram of a lottery syndicate system in accordance with an embodiment of the present invention.

According to an embodiment of the present invention, there is provided a lottery syndicate system 100 as shown in FIG. 1. The lottery syndicate system 100 includes a syndicate administration server 102 for receiving confirmation that a lottery syndicate member with a mobile internet device 104, 106 (e.g. smart phone, iPAD, PDA, laptop, etc.) is at a geographic location to qualify as a member of a lottery ticket syndicate. The geographic location is a coffee shop or other store which has increased patronage by virtue of the lottery syndicate members being at that store location. The member qualifies for an incentive (e.g. discounted coffee from the coffee shop) upon joining the lottery ticket syndicate. A detailed description of the system 100 is provided below.

The syndicate administration server 102 executes a software product (being machine readable instructions) and hosts a syndicate website by which the lottery ticket syndicate can be organized. The system 100 includes a syndicate member's mobile internet device in the form of a smart phone 104 (e.g. iPhone) for accessing the syndicate website over the Internet 108. The smart phone 104 has global positioning system (GPS) capabilities and sends the geographic location of the phone 104 (and therefore syndicate member) to the server 102.

The system 100 also includes a syndicate member's mobile Internet device in the form of a laptop computer 106. The laptop computer 106 can gain access over a wireless LAN (or WI-FI) network 110 to the coffee shop's server 112, in turn, able to access the syndicate website hosted by server 102 over the Internet 108. The laptop computer 106 can send confirmation that the lottery syndicate member is at the coffee shop (i.e. geographic location) to qualify for the lottery ticket syndicate.

The system 100 also includes a lottery server 114 typically administered by a lottery provider (e.g. New York Lottery, the Tatts Group, etc.) conducting a lottery. The formed syndicate may purchase a ticket for the lottery via the syndicate administration website. The lottery ticket includes a selected subset of numbers that are later drawn to determine a win.

The system 100 includes social networking server 116 for hosting a social networking website (e.g. Facebook, twitter, etc.). The social networking server 116 connected to server 102 can send advance meeting invitations for the syndicate members to meet at the geographic location to join the syndicate.

The syndicate administration server 102 include a syndicate verification module 118 to confirm that syndicate members are or have been at the geographic location to qualify for membership of the syndicate. The server 102 further includes an incentive module 120 for providing the syndicate members with an incentive to join the syndicate. The incentive may include an increased prize pool whereby each additional syndicate member increases the prize pool by a further amount (e.g. $1 million) up to a reasonable limit (e.g. total prize pool cannot exceed $6 million). Alternatively, the incentive may include an increased number selection for the draw whereby each additional syndicate member is eligible to select another number for the lottery draw up to a reasonable limit (i.e. no more than a total of four additional numbers for a six number lottery draw—i.e. a selection of ten numbers in total).

The syndicate administration server 102 further includes an invitation module 122 for sending syndicate membership invitations to syndicate members to join the syndicate. Furthermore, the syndicate administration server 102 includes a ticket purchasing module 124 for purchasing a lottery ticket for the syndicate and a result notification module 126 for notifying each syndicate member of the lottery draw result.

Figure 2:
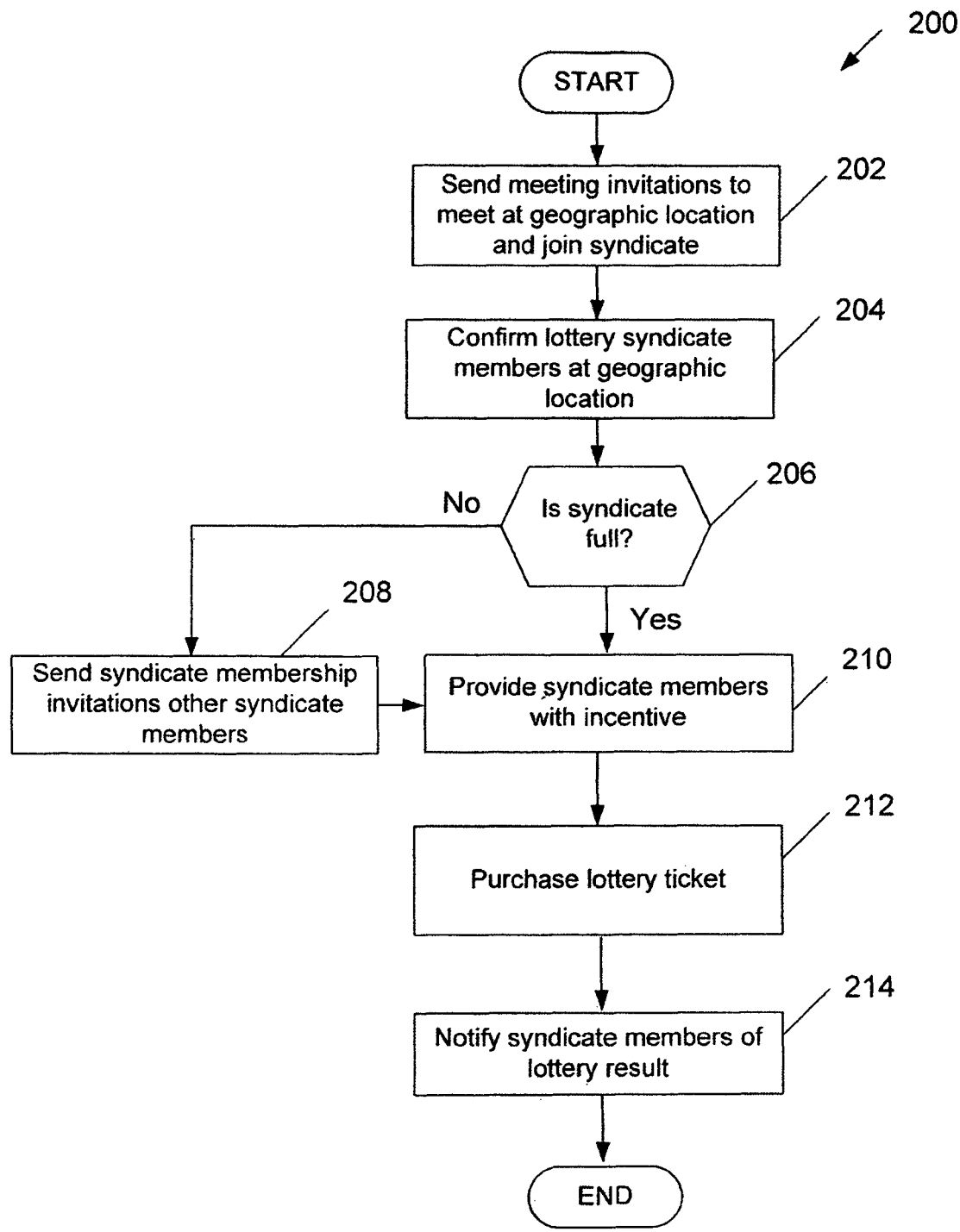
FIG. 2 is a flowchart showing a lottery syndicate method performed with the system of FIG. 1 and in accordance with an embodiment of the present invention.

A lottery syndicate method 200 performed with the system 100 is now described with reference to FIG. 2.

At step 202, the syndicate administration server 102 connects to the social networking server 116 and sends meeting invitations to the accounts of prospective syndicate members to meet at the coffee shop (i.e. geographic location) to join the syndicate. Elaborating further, a syndicate manager (and member) uses the social networking website (e.g. Facebook) to set up a meeting request to send to friends who would be potentially interested in joining the syndicate. The friends could then send a response indicating whether or not they intend to join the syndicate at the coffee shop.

At step 204 when the syndicate members meet at the coffee shop, the syndicate verification module 118 of the syndicate administration server 102 receives confirmation of the lottery syndicate members being at the coffee shop to qualify for the lottery ticket syndicate. Check-in notifications from the mobile internet devices 104, 106 connected to the syndicate website are received by the server 102. At the time of receiving the first check-in, the server 204 establishes a time window (e.g. 15 minutes), and subsequent check-ins (up to a maximum number of syndicate members) within the window are linked to the syndicate to qualify for the incentive.

At query step 206, the syndicate administration server 102 queries whether or not the syndicate is full. If the syndicate is not full, the invitation module 122 of the server 102 sends syndicate membership invitations at step 208. Alternatively, if the syndicate is full, the method 200 proceeds to step 210.

At step 208, the invitation module 122 of the syndicate administration server 102 sends syndicate membership invitations to any potential unsubscribed syndicate members to join the syndicate. The invitations are sent during the time window responsive to searching for and detecting the presence of prospective syndicate members with mobile internet devices 104, 106 near or at the coffee shop.

At step 210, the incentive module 120 of the server 102 provides the syndicate members with an advertised incentive for which they are now qualified to obtain through joining the syndicate.

At step 212, the ticket purchasing module 124 of the server 102 purchases a lottery ticket for the syndicate responsive to passing of the time window. The ticket is purchased conditional to all syndicate members being at the geographic location and satisfying payment conditions (e.g. having a viable financial account from which payment can be obtained) and other conditions (e.g. being over 18 years of age) for the ticket.

At step 214, the result notification module 126 of server 102 notifies each syndicate member of the result via their mobile internet device 104, 106, irrespective of whether the syndicate members are still at the geographic location.

The foregoing syndicate system 100 and method 200 provide for increased patronage of the coffee shop by the syndicate members, and provide for improved lottery syndicate play by virtue of ease of co-ordination and incentives for syndicate participation. Further, the gathering of the syndicate members at a store location enhances the fun of the lottery experience.

A person skilled in the art will appreciate that many embodiments and variations can be made without departing from the ambit of the present invention.

For example, at step 204 above, the syndicate members were all simultaneously at the geographic location to qualify for the syndicate. In another embodiment, the members can register at the geographic location and then leave prior to the ensuing steps.

In one embodiment, the incentive is provided to the syndicate members responsive to the lottery ticket purchase.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The claims defining the invention are as follows:

1. A computer-implemented lottery syndicate method comprising:
    connecting, by a server computer, via a computer network, to a social networking server that is remote relative to the server computer;
    sending, by the server computer, over the computer network, instructions to the social networking server to transmit meeting invitations to a plurality of prospective syndicate members, the meeting invitations providing a particular geographic location for the plurality of prospective syndicate members to meet to join a lottery ticket syndicate;
    receiving, by the server computer, from a first GPS-enabled device of a first prospective syndicate member, a first confirmation of the first prospective syndicate member of the plurality of prospective syndicate members being at the particular geographic location, based on a geographic position, of the first prospective syndicate member, determined by the first GPS-enabled device;
    in response to receiving the first confirmation, qualifying the first prospective syndicate member as a member of the lottery ticket syndicate and establishing a time window for becoming a member of the lottery ticket syndicate;
    receiving, by the server computer, from a second GPS-enabled device of a second prospective syndicate member, a second confirmation of the second prospective syndicate member of the plurality of prospective syndicate members being at the particular geographic location, based on a geographic position, of the second prospective syndicate member, determined by the second GPS-enabled device;
    in response to receiving the second confirmation and determining that the second confirmation was received within the time window, qualifying the second prospective syndicate member as a member of the lottery ticket syndicate;
    determining, by the server computer within the time window, whether the lottery ticket syndicate is full;
    in response to determining that the lottery ticket syndicate is not full, sending syndicate membership invitations to other prospective syndicate members of the plurality of prospective syndicate members who are different than the first prospective syndicate member and the second prospective syndicate member;
    after sending the syndicate membership invitations to the other prospective syndicate members, determining whether the time window has passed and the lottery ticket syndicate is full;
    in response to determining that the time window has passed and the lottery ticket syndicate is full, determining, by the server computer, that all members of the lottery ticket syndicate have been at the particular geographic location within the time window;
    purchasing a ticket for the lottery ticket syndicate from a syndicate website that is hosted by the server computer in response to determining that all members of the lottery ticket syndicate have been at the particular geographic location within the time window; and
    in response to purchasing the ticket, providing an incentive to each member of the lottery ticket syndicate, the incentive including a discount provided by a store at or near the particular geographic location.

2. A lottery syndicate method as claimed in claim 1, wherein the first prospective syndicate member and second prospective syndicate member need to be at the particular geographic location simultaneously to qualify as a member of the lottery ticket syndicate.

3. A lottery syndicate method as claimed in claim 1, wherein the incentive includes an increased prize pool or selection of numbers for a draw.

4. A lottery syndicate method as claimed in claim 1, further including notifying each syndicate member of a lottery draw result.

5. A lottery syndicate method as claimed in claim 1, wherein the invitations are transmitted during a time window, or responsive to searching for and detecting presence of the prospective syndicate members at the particular geographic location.

6. A computer system comprising:
    one or more processors;
    one or more memories storing instructions which, when executed by the one or more processors, cause:
    connecting, by a server computer, via a computer network, to a social networking server that is remote relative to the server computer;
    sending, by the server computer, over the computer network, instructions to the social networking server to transmit meeting invitations to a plurality of prospective syndicate members, the meeting invitations providing a particular geographic location for the plurality of prospective syndicate members to meet to join a lottery ticket syndicate;
    receiving, from a first GPS-enabled device of a first prospective syndicate member, a first confirmation of the first prospective syndicate member of the plurality of prospective syndicate members being at the particular geographic location, based on a geographic position, of the first prospective syndicate member, determined by the first GPS-enabled device;

in response to receiving the first confirmation, qualifying the first prospective syndicate member as a member of the lottery ticket syndicate and establishing a time window for becoming a member of the lottery ticket syndicate;

receiving, from a second GPS-enabled device of a second prospective syndicate member, a second confirmation of the second prospective syndicate member of the plurality of prospective syndicate members being at the particular geographic location, based on a geographic position, of the second prospective syndicate member, determined by the second GPS-enabled device;

in response to receiving the second confirmation and determining that the second confirmation was received within the time window, qualifying the second prospective syndicate member as a member of the lottery ticket syndicate;

determining, within the time window, whether the lottery ticket syndicate is full;

in response to determining that the lottery ticket syndicate is not full, sending syndicate membership invitations to other prospective syndicate members of the plurality of prospective syndicate members who are different than the first prospective syndicate member and the second prospective syndicate member;

after sending the syndicate membership invitations to the other prospective syndicate members, determining whether the time window has passed and the lottery ticket syndicate is full;

in response to determining that the time window has passed and the lottery ticket syndicate is full, determining that all members of the lottery ticket syndicate have been at the particular geographic location within the time window;

purchasing a ticket for the lottery ticket syndicate from a syndicate website in response to determining that all members of the lottery ticket syndicate have been at the particular geographic location within the time window; and in response to purchasing the ticket, providing an incentive to each member of the lottery ticket syndicate, the incentive including a discount provided by a store at or near the particular geographic location.

7. The computer system of claim 6, wherein the first prospective syndicate member and second prospective syndicate member need to be at the particular geographic location simultaneously to qualify as a member of the lottery ticket syndicate.

8. The computer system of claim 6, wherein the incentive includes an increased prize pool or selection of numbers for a draw.

9. The computer system of claim 6, further including notifying each syndicate member of a lottery draw result.

10. The computer system of claim 6, wherein the invitations are transmitted during a time window, or responsive to searching for and detecting presence of the prospective syndicate members at the particular geographic location.

11. A computer-implemented method for facilitating a lottery syndicate game, the method comprising:

connecting, by a server computer, via a computer network, to a social networking server that is remote relative to the server computer;

sending, by the server computer, over the computer network, instructions to the social networking server to transmit meeting invitations to a plurality of GPS-enabled devices of a plurality of prospective syndicate members, the meeting invitations providing a particular geographic location for the plurality of prospective syndicate members to meet to join a lottery ticket syndicate;

determining, by the server computer, a plurality of members of the lottery ticket syndicate based on a plurality of confirmations of the meeting invitations received within a time window from the plurality of GPS-enabled devices of the plurality of prospective syndicate members;

in response to determining that the time window has passed, determining, by the server computer, that all members of the lottery ticket syndicate have been at the particular geographic location within the time window based on a geographic position, of each prospective syndicate member in the plurality of syndicate members, determined by the respective GPS-enabled device of the plurality of GPS-enabled devices;

purchasing, using the server computer, a ticket for the lottery ticket syndicate from a syndicate website that is hosted by the server computer in response to determining that all members of the lottery ticket syndicate have been at the particular geographic location within the time window; and in response to purchasing the ticket, providing, by the server computer, an incentive to each member of the lottery ticket syndicate, the incentive including a discount provided by a store at or near the particular geographic location.

* * * * *